Nov. 13, 1951  J. J. ROZNER  2,575,072
RETAINER AND SPACER FOR ROLLER BEARINGS
Filed Sept. 1, 1949  3 Sheets-Sheet 1
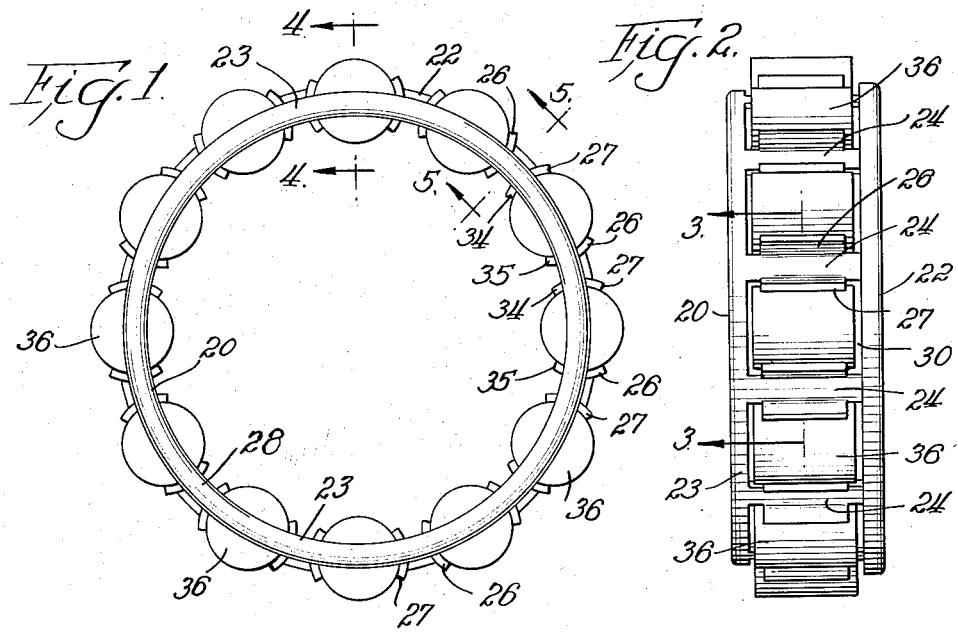
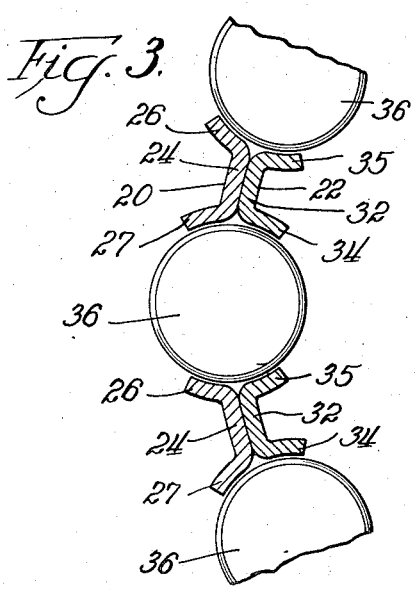
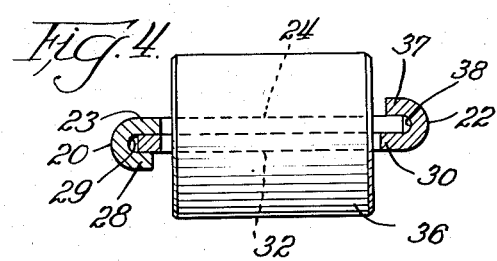
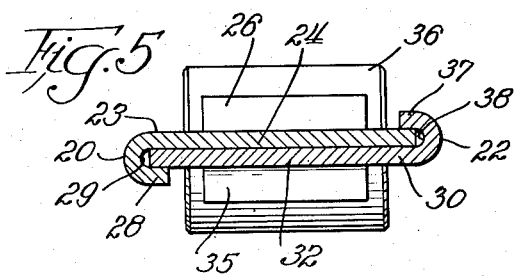
INVENTOR.
Joseph J. Rozner
BY
Attys.

Nov. 13, 1951  J. J. ROZNER  2,575,072
RETAINER AND SPACER FOR ROLLER BEARINGS
Filed Sept. 1, 1949  3 Sheets-Sheet 2
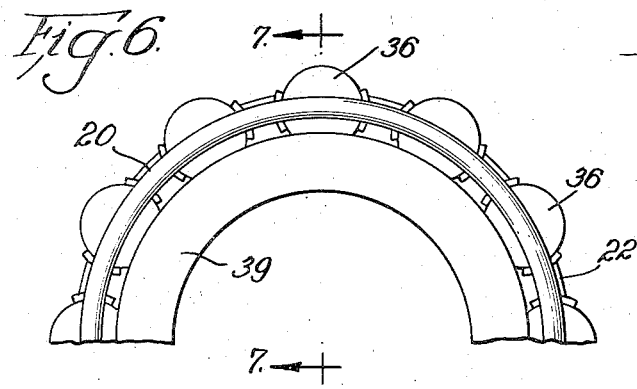
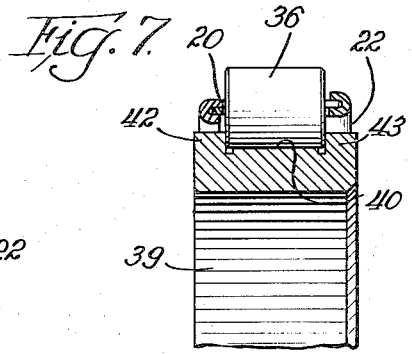
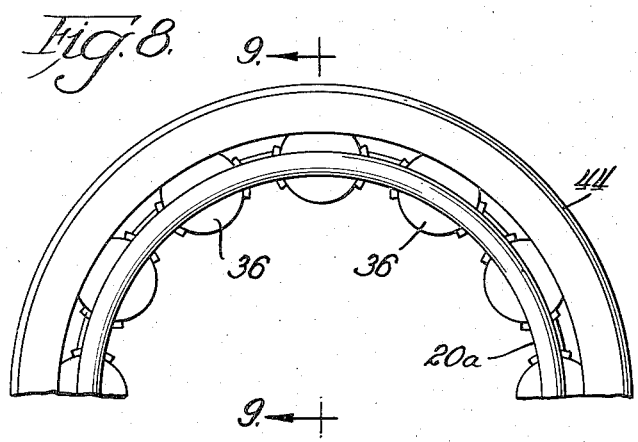
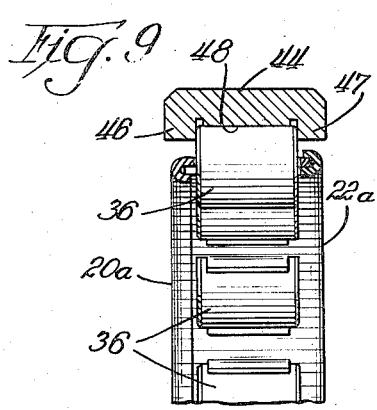
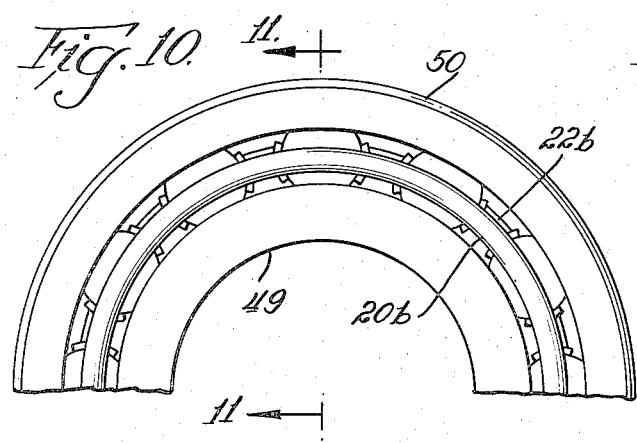
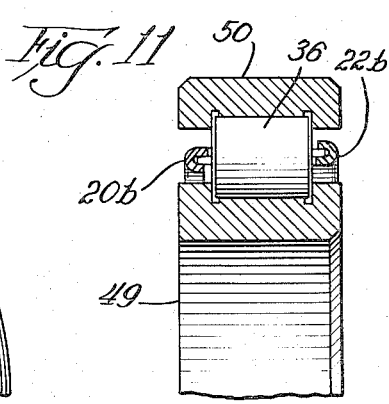
INVENTOR.
Joseph J. Rozner
BY Albert D. McCabe
Att'y.

Nov. 13, 1951     J. J. ROZNER     2,575,072
RETAINER AND SPACER FOR ROLLER BEARINGS
Filed Sept. 1, 1949     3 Sheets-Sheet 3
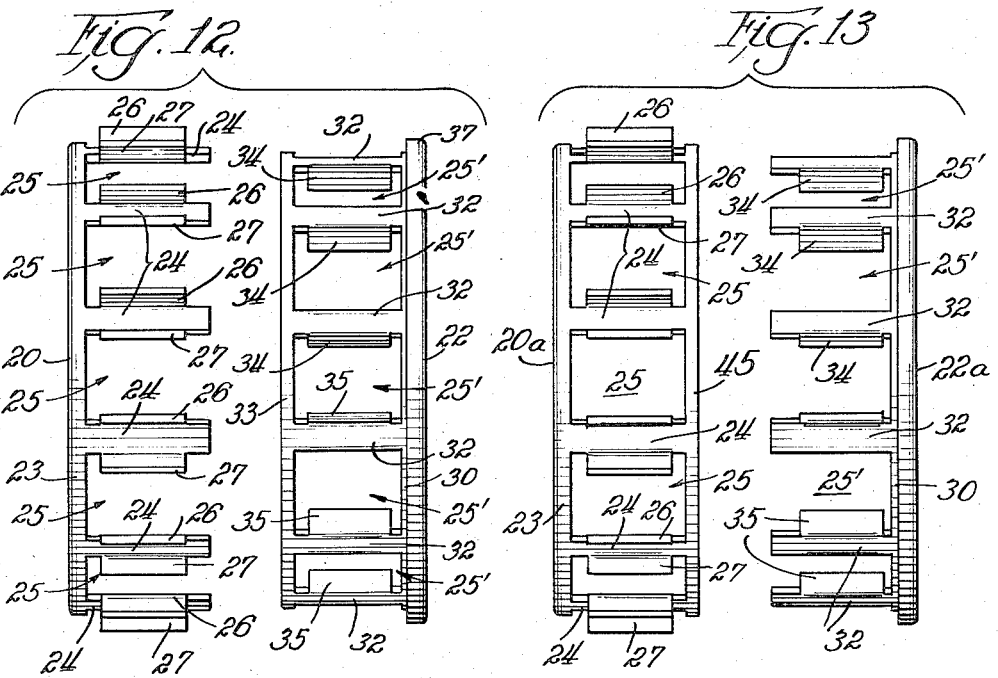
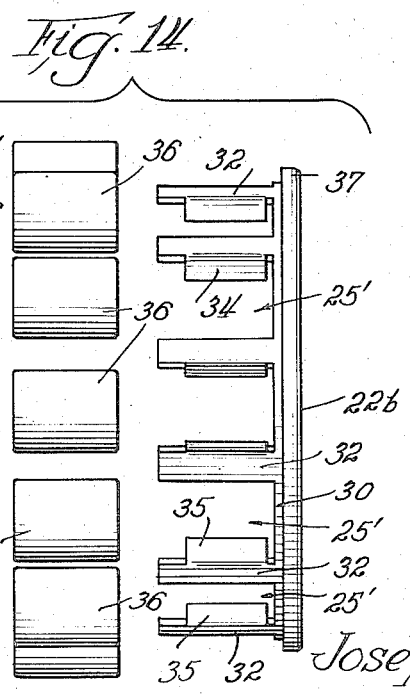
INVENTOR.
Joseph J. Rozner Patented Nov. 13, 1951

2,575,072

UNITED STATES PATENT OFFICE 2,575,072

RETAINER AND SPACER FOR ROLLER BEARINGS

Joseph J. Rozner, Chicago, Ill., assignor to Aetna Ball & Roller Bearing Co., Chicago, Ill., a corporation of Illinois Application September 1, 1949, Serial No. 113,586

10 Claims. (Cl. 308—217)

This invention relates to structures for retaining and separating the rollers in roller bearings, and more particularly to such structures which are adapted independently to hold such rollers in an assembly for application to a selected use, or to serve in conjunction with various types of races.

One of the objects of this invention is to provide roller retainer structures of two-piece construction and adapted to ease of assembly, either with rollers alone, or with the rollers and various types of roller races.

As another object, my invention has within its purview the provision of a roller retainer structure adapted to fabrication from sheet metal and formed not only to provide for ease of assembly, but also to effect circumferential and lateral strength.

My invention further comprehends the provision of a roller retainer assembly of two-piece construction which, when assembled, forms a unitary structure with the parts of the pieces complementing and reinforcing one another.

Another object of my invention is to provide a roller retainer structure of two-piece construction and which embodies integrally formed pieces so constructed and arranged that they are readily secured in assembled relationship by a simple mechanical operation.

Other objects and advantages of the invention will be apparent from the following description and the accompanying drawings in which similar characters of reference indicate similar parts throughout the several views.

Referring to the three sheets of drawings,

Fig. 1 is an end elevational view of a roller bearing assembly which includes a retainer and spacer embodying a preferred form of my invention;

Fig. 2 is a side elevational view of the roller bearing assembly illustrated in Fig. 1;

Fig. 3 is a fragmentary end sectional view drawn to a scale larger than Figs. 1 and 2 and wherein the section is taken substantially on a line 3—3 of Fig. 2 and in the direction indicated by the accompanying arrows;

Figs. 4 and 5 are respectively end sectional views drawn to an enlarged scale and taken substantially on lines 4—4 and 5—5 of Fig. 1 and in the directions indicated by accompanying arrows;

Fig. 6 is a fragmentary end elevational view showing the adaptation of the spacer and retainer structure of Figs. 1 to 5 inclusive to a bearing having an inner race;

Fig. 7 is a fragmentary side sectional view taken on a line 7—7 of Fig. 6 and in the direction indicated by arrows;

Fig. 8 is a fragmentary end elevational view illustrating the adaptation of a modified form of my retainer and spacer to a roller bearing having an outer race;

Fig. 9 is a fragmentary side sectional view of the bearing assembly shown in Fig. 8 and wherein the section is taken substantially on a line 9—9 of Fig. 8 and viewed in the direction of the arrows;

Fig. 10 is a fragmentary end elevational view showing the adaptation of another modified form of my retainer and spacer assembly in its adaptation to a roller bearing having both inner and outer races;

Fig. 11 is a fragmentary side sectional view wherein the section is taken substantially on a line 11—11 of Fig. 10 and in the direction indicated by arrows;

Fig. 12 is a side elevational view of the retainer and spacer which is illustrated in Figs. 1 to 5 inclusive, with the parts thereof separated and with the rollers removed;

Fig. 13 is a side elevational view similar to Fig. 12, which shows the separated parts of the retainer and spacer for the assembly depicted in Figs. 8 and 9; and Fig. 14 is a side elevational view showing the separated parts of the retainer and spacer utilized in the bearing assembly of Figs. 10 and 11, and wherein the rollers are shown between the spaced parts to give an indication of the manner of their assembly with the parts.

In the accompanying drawings, exemplary embodiments of my invention have been depicted for illustrative purposes. Figs. 1 to 5 depict an assembly which includes a preferred embodiment of my invention, the retainer and spacer parts for which are also illustrated in Fig. 12. In order to facilitate the assembly of the rollers with my retainer and spacer structure, with the parts thereof made of hardened sheet stock to promote long wear, and without the necessity of deforming those parts to effect the insertion of the rollers, I prefer to utilize a pair of readily fabricated and circular sheet metal shells 20 and 22, each of which supplements and reinforces the other in the assembly. This structural combination and relationship also applies to the modified forms of my invention.

The shell 20 includes a circular and endless band portion 23 at one end, from which integral spacing ribs 24 project axially of the shell in equally spaced relationship circumferentially thereof to define roller receiving slots 25. As an integral formation on each of the rib portions 24, roller retaining flanges 26 and 27 project angularly from opposite side edges thereof. In the disclosed embodiment and form of my invention, the flanges 26 and 27 project outwardly of the axis of the shell in directions generally radial to the shell. By preference, each of the flanges 26 and 27 is curved to present a concave arcuate surface facing the adjacent roller receiving slot and having a radius substantially conforming to a predetermined size of rollers which are to be utilized in the bearing. On the end of the band 23 opposite the projecting rib portions 24 and as depicted in Figs. 4 and 5, a return bend lip flange 28 extends inwardly of the shell and defines a channel 29 opening axially of the shell and toward the projecting rib portions. It may be observed that the lip flange extends in a direction opposed to the direction of projection of the roller retaining flanges 26 and 27.

The second shell 22, of the pair, has a circular and endless band 30 at one end from which rib portions 32, integrally formed with the band, projects axially of the shell. The rib portions 32 of the shell 22 conform in their circumferential spacing to the rib portions 24 of the shell 20 and define roller receiving slots 25'. As contrasted to the shell 20, the ends of the rib portions 32 of the shell 22 opposite the band 30 are joined for reinforcement by an integral circular band 33, so that the slots 25 in the shell 20 are open at one end and the slots 25' of the shell 22 are closed at both ends. The respective diameters of the shells are so related to one another that the shell 22 nests within the shell 20 with relttively snug fit therebetween and with adjacent rib portion and band surfaces thereof juxtaposed.

On the opposite edges of the rib portions 32, integral flanges 34 and 35 project inwardly of the shell 22 in a generally radial direction. These flanges, like flanges 26 and 27, are preferably arcuate, as shown in Fig. 3, with concave surfaces conforming to a predetermined roller diameter and facing the adjacent roller receiving socket. In the disclosed embodiment of this invention, it may be observed that the juxtaposed surfaces of the two shells, in their assembled relationship, lie substantially on the axial center line of a series of rollers 36, which rollers, in the assembly, are retained radially thereof between the flanges and axially between the bands at the ends of the shells. As in the instance of the shell 20, the shell 22 has a return bent lip flange 37 extending around the periphery of the band 30 at one end thereof and defining a channel 38 which opens axially of the shell toward the rib portions 32. Furthermore, the radial projection of the lip flange 37 is opposed to that of the roller retaining flanges 34 and 35 on the shell 22. The lip flanges 28 and 37 on the shells 20 and 22 respectively are at opposite ends of the shells, so that in assembly, each of the channels 29 and 38 receive the ends of the rib portions of the other shell. With this structure, the crimping or indentation of the lip flanges at spaced positions secures the shells in their assembled relationship, thereby making the roller and shell assembly, as illustrated in Figs. 1 to 5, inclusive, a unitary structure capable of use and sale in that form.

As depicted in Figs. 6 and 7, the retainer and spacer assembly of Figs. 1 to 5, inclusive, and 12 is well adapted to use with a roller bearing having an inner race 39, and can be assembled with such race, even though a roller raceway 40 has flanges 42 and 43 at the opposite ends thereof. To effect the assembly of this combination, the shell 22 is first placed around the periphery of the race 39 and the rollers 36 assembled therewith and held in position while the shell 20 is pressed into position axially of the bearing. The subsequent crimping or indentation of the lip flanges of the two shells makes a permanent assembly of the rollers, roller retainer and spacer assembly and the race 39.

The roller retainer and spacer assembly depicted in Figs. 8, 9 and 13 is quite similar in general organization and structure to that illustrated in Figs. 1 to 7, inclusive, and 12. Certain modifications, however, are made to provide a similarly reinforced retainer and spacer assembly adapted to uses, such as assembly with an outer race 44, as shown in Figs. 8 and 9. This adaptation is effected by providing an outer shell 20a having a band 45 connecting the ends of the rib portions opposite the lip flange thereof. Also, an inner shell 22a has the band eliminated from the ends of the rib portions. Otherwise, the shells 20a and 22a are substantially like the shells 20 and 22 respectively and corresponding reference characters refer to like parts of the shells which perform similar functions.

Figs. 8 and 9 depict the assembly of the shells 20a and 22a, together with a complement of rollers 36, with the outer race 44 which has axial roller retaining flanges 43 and 47 at opposite ends of a raceway 48. This assembly is accomplished by first placing the shell 20a within the race 44 and then assembling and retaining the rollers in that shell while the shell 22a is pressed into position axially of the bearing.

Figs. 10, 11 and 14 illustrate another modification of my shell structures and the assembly thereof with inner and outer races 49 and 50 respectively, which latter races may both have flanges at opposite ends. In this form, as shown in Fig. 14, shells 20b and 22b are like the shells 20 and 22a, in that neither has a reinforcing band at the ends of the rib portions opposite the lip flanges. In other respects, the descriptions of parts bearing similar reference numerals are applicable to the parts of the shells 20b and 22b.

The assembly illustrated in Figs. 10 and 11 is effected by placement of a required number of rollers in a group between the races 49 and 50, and then distributing them peripherally to appropriate positions. With this accomplished, one of the shells is moved into position between the races axially of the bearing and from one end of the bearing. Thereafter, the other shell is pressed into position axially of the bearing from the other end thereof.

From the foregoing description and reference to the accompanying drawings, it may be readily appreciated that I have provided a roller bearing retainer and spacer assembly which is not only capable of independent use, but with relatively few and simple modifications is adapted to ease of assembly with a variety of different roller race structures. Furthermore, and in addition to being susceptible to ease of assembly, my disclosed retainer and spacer assembly embodies parts which may be extensively and uniformly manufactured in production quantities. The component parts of the retainer and spacer assembly cooperate to reinforce and rigidify one another, and long use thereof in service may be insured, because the nature of the assembly, in each instance, is such that the parts may be hardened before assembly.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A retainer and spacer for roller bearings comprising, in combination, a pair of circular and generally cylindrical sheet metal shells having diameters such that one fits with relative snugness within the other, said shells having radially aligned roller receiving slots therein which are spaced uniformly and equally around the shells, the slots of at least one of the shells being open at the end of the shell, said shells including integral and axial rib portions between the slots, and said rib portions having roller retaining flanges integrally formed on the axial edges thereof and projecting therefrom in generally radial directions, said flanges on the shells of the pair projecting oppositely and said flanges on opposite sides of the slots being curved to retain rollers of a predetermined size therebetween when the shells are assembled together, each of said shells having a return bent peripheral flange at one end thereof formed and directed to present a peripheral channel opening axially of the shell and to overlie end marginal portions of the rib portions of the other shell when the shells of a pair are assembled together, and means including said peripheral flanges for securing the shells of a pair in assembled relationship.

2. A retainer and spacer for roller bearings as defined in claim 1, and wherein one and only one of said shells is further characterized by an integral band portion connecting the ends of rib portions opposite the peripheral flange thereof.

3. A retainer and spacer for roller bearings as defined in claim 1 and characterized for use in a bearing having an inner race by the inner one of said pair of shells having an integral band connecting the ends of said rib portions at the ends thereof opposite the peripheral flange, and the slots of the outer one of said pair of shells being open at the ends thereof opposite its peripheral flange.

4. A retainer and spacer for roller bearings as defined in claim 1 and characterized for use in a bearing having an outer race by the outer one of said pair of shells having an integral band connecting the ends of said rib portions thereof at the ends opposite the peripheral flange, and the slots of the inner one of said pair of shells being open at the ends thereof opposite its peripheral flange.

5. A retainer and spacer for roller bearings as defined in claim 1 and characterized for use in a bearing having both inner and outer races by the slots of both of said shells of a pair being open at the ends thereof opposite the peripheral flanges of the respective shells.

6. A retainer and spacer for roller bearings having a predetermined roller center line radius and comprising, in combination, a pair of circular and generally cylindrical sheet metal shells having diameters such that one nests within the other with adjacent surfaces of the two shells juxtaposed at a radius substantially coincident with the roller center line radius, said shells having roller receiving slots therein spaced uniformly around the shells, the slots of at least one of the shells being open at the end of the shell, said shells each including integrally formed rib portions between the slots and disposed axially of the shell, said rib portions of each shell having roller retaining means thereon projecting from the respective rib portions in directions away from said surfaces of the shells, and each of said shells having integrally formed on one end thereof a return bent and peripheral lip flange presenting a channel opening axially of the shell and toward the rib portions thereof, said lip flanges being on the sides of said adjacent surfaces of each of the shells in assembly opposite the sides from which the roller retaining means project, and said channels of each shell being of a size to receive end marginal portions of the other shell.

7. A retainer and spacer for roller bearings as defined in claim 6, and wherein one of the shells is further characterized by an integral band portion connecting the ends of the rib portions thereof opposite the lip flange.

8. A retainer and spacer for roller bearings as defined in claim 6, and wherein only one of the shells is further characterized by said roller receiving slots of the shell being open at the end of the shell opposite the lip flange thereof.

9. A retainer and spacer for roller bearings as defined in claim 6, and wherein said shells are further characterized by said roller receiving slots being open at the ends thereof opposite the respective lip flanges and of substantially uniform peripheral widths throughout their lengths.

10. A retainer and spacer for roller bearings comprising, in combination, a pair of circular and generally cylindrical sheet metal shells having uniform diameters such that one nests within the other with adjacent surfaces of the two shells juxtaposed, said shells each including integral rib portions projecting axially of the shell from an integral and endless band portion at one end thereof, said rib portions being spaced circumferentially with uniformity and substantial equality on the shells of the pair for radial alignment in assembly to define roller receiving slots, and each of the shells having integrally formed on one end thereof a return bent peripheral lip flange presenting a channel open axially of the shell and toward the rib portions thereof, the roller receiving slots of at least one of the shells being open at the end of the shell opposite the lip flange thereon, and said lip flanges being at opposite ends of the shells in assembly and each adapted to overlie and grip end portions of the rib portions of the other shell.

JOSEPH J. ROZNER

REFERENCES CITED

The following references are of record in the file of this patent:

UNITED STATES PATENTS

| Number | Name | Date |
| --- | --- | --- |
| 1,100,179 | Foster | June 16, 1914 |
| 1,350,680 | Stewart | Aug. 20, 1920 |
| 1,358,848 | Hindle et al. | Nov. 16, 1920 |
| 1,444,964 | Foster | Feb. 13, 1923 |
| 2,122,365 | Beck | June 28, 1938 |